(12) United States Patent
Sone et al.

(10) Patent No.: US 8,517,534 B2
(45) Date of Patent: Aug. 27, 2013

(54) SEMI-FINISHED BLANK FOR VARIFOCAL LENS, VARIFOCAL LENS MADE FROM THIS BLANK, AND VARIFOCAL EYEGLASSES FEATURING THIS LENS

(75) Inventors: Kouji Sone, Ehime (JP); Satoko Machida, Ehime (JP); Tsugumasa Hitomi, Ehime (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/514,737

(22) PCT Filed: Oct. 19, 2011

(86) PCT No.: PCT/JP2011/005835
§ 371 (c)(1),
(2), (4) Date: Jun. 8, 2012

(87) PCT Pub. No.: WO2012/086112
PCT Pub. Date: Jun. 28, 2012

(65) Prior Publication Data
US 2012/0287397 A1 Nov. 15, 2012

(30) Foreign Application Priority Data
Dec. 21, 2010 (JP) .................................. 2010-284930

(51) Int. Cl.
*G02B 7/00* (2006.01)
*G02B 7/02* (2006.01)
*G02B 7/04* (2006.01)

(52) U.S. Cl.
USPC .................................. 351/159.4; 351/159.39

(58) Field of Classification Search
USPC .............. 351/159.03, 159.39, 159.4; 349/13, 349/14, 200; 359/315, 319
See application file for complete search history.

(56) References Cited

U.S. PATENT DOCUMENTS

| 6,795,157 B2 * | 9/2004 | Okuwaki et al. ............... 349/200 |
| 2004/0043710 A1 | 3/2004 | Miyazawa |
| 2009/0256977 A1 | 10/2009 | Haddock et al. |
| 2012/0081659 A1 * | 4/2012 | Matsui ..................... 351/159.39 |

FOREIGN PATENT DOCUMENTS

JP 2002-263998 9/2002

OTHER PUBLICATIONS

International Search Report issued Dec. 20, 2011 in International (PCT) Application No. PCT/JP2011/005835.
Written Opinion of the International Searching Authority issued Dec. 20, 2011 in International (PCT) Application No. PCT/JP2011/005835.

* cited by examiner

*Primary Examiner* — Jordan Schwartz
(74) *Attorney, Agent, or Firm* — Wenderoth, Lind & Ponack, L.L.P.

(57) ABSTRACT

This semi-finished blank for a varifocal lens comprises a first substrate (13), a second substrate (15) that is opposite the first substrate (13), a first transparent conductive film (27) produced on the front of the first substrate (13), a second transparent conductive film (33) produced on the back of the second substrate (15), a varifocal section (5) disposed between the front of the first substrate (13) and the back of the second substrate (15); a first internal electrode (17) of the first transparent conductive film (27), a second internal electrode (19) of the second transparent conductive film (33), a first laser separation film (29) that is opposite the second internal electrode (19) and in which a partial region of the first transparent conductive film (27) is separated with a laser, and a second laser separation film (35) that is opposite the first internal electrode (19) and in which a partial region of the second transparent conductive film (33) is separated with a laser.

9 Claims, 12 Drawing Sheets

SEMI-FINISHED BLANK FOR VARIFOCAL LENS, VARIFOCAL LENS MADE FROM THIS BLANK, AND VARIFOCAL EYEGLASSES FEATURING THIS LENS

TECHNICAL FIELD

The present invention relates to an optical member with which the focus can be varied by applying voltage to a varifocal section.

BACKGROUND ART

A semi-finished blank for a varifocal lens comprises a lower substrate whose upper face has a convex curve, an upper substrate that has a lower face with a concave curve and that is joined opposite this upper face, etc. A varifocal section composed of a liquid crystal material is disposed between the upper and lower substrates.

Varifocal eyeglasses are obtained from such a semi-finished blank for a varifocal lens, by going through a specific process. Varifocal eyeglasses allow the refractive index to be changed by applying voltage to the varifocal section, and can be used as bifocal eyeglasses, for example (see Patent Literature 1).

CITATION LIST

Patent Literature

Patent Literature 1: Laid-Open US Patent Application 2009/256977

SUMMARY

Technical Problem

However, the following problems were encountered with the conventional constitution discussed above.

Specifically, with these varifocal eyeglasses, thin films such as transparent conductive films are produced between the varifocal section and the upper and lower substrates. Also, internal electrodes are formed on the upper and lower substrates so as to be electrically connected to the transparent conductive films. With a configuration such as this, the application of voltage to the varifocal section is performed by coating the internal electrode ends of the transparent conductive films with silver paste from the side faces of the lens, and using this silver paste as an external electrode. However, since the upper and lower transparent conductive films are extremely close together, there is the risk that the upper and lower transparent conductive films will be short circuited by the silver paste coating.

It is an object of the present invention to provide a semi-finished blank for a varifocal lens, with which short circuiting between the upper and lower transparent conductive films can be effectively prevented, and which therefore has a high commercial value, as well as a varifocal lens made from this blank, and varifocal eyeglasses in which these lenses are used.

To achieve the stated object, the semi-finished blank for a varifocal lens of the present invention comprises a first substrate, a second substrate, a first transparent conductive film, a second transparent conductive film, a varifocal section, a first internal electrode, a second internal electrode, a first separation film, and a second separation film. The second substrate is opposite the first substrate. The first transparent conductive film is produced on the front of the first substrate. The second transparent conductive film is produced on the back of the second substrate. The varifocal section is disposed between the front of the first substrate and the back of the second substrate. The first internal electrode is connected to the first transparent conductive film. The second internal electrode is connected to the second transparent conductive film. The first separation film is provided at a location opposite the second internal electrode and separates a partial region of the first transparent conductive film. The second separation film is provided at a location opposite the first internal electrode and separates a partial region of the second transparent conductive film.

With the semi-finished blank for a varifocal lens of the present invention, it is preferable if the first separation film and/or the second separation film is separated from the first transparent conductive film and the second transparent conductive film around the outer periphery by a substantially U-shaped cut-out.

Also, with the semi-finished blank for a varifocal lens of the present invention, it is preferable if the first and/or second separation film is separated from the first and second transparent conductive films with a multiple laser beam.

The varifocal lens of the present invention comprises a first substrate, a second substrate, a first transparent conductive film, a second transparent conductive film, a varifocal section, a first internal electrode, a second internal electrode, a first terminal, a second terminal, a first separation film, and a second separation film. The second substrate is opposite the first substrate. The first transparent conductive film is produced on the front of the first substrate. The second transparent conductive film is produced on the back of the second substrate. The varifocal section is disposed between the front of the first substrate and the back of the second substrate. The first internal electrode is connected to the first transparent conductive film. The second internal electrode is connected to the second transparent conductive film. The first terminal and second terminal are connected to the first internal electrode and the second internal electrode, and are provided to the respective side faces of the lens. The first separation film is provided at a location opposite the second internal electrode and separates a partial region of the first transparent conductive film. The second separation film is provided at a location opposite the first internal electrode and separates a partial region of the second transparent conductive film.

Also, it is preferable if the varifocal lens of the present invention further comprises a first external electrode that connects the first terminal and the second separation film, and a second external electrode that connects the second terminal and the first separation film.

It is also preferable with the varifocal lens of the present invention if the first external electrode and the second external electrode are made up of silver paste.

The varifocal lens of the present invention can constitute varifocal eyeglasses along with a specific controller.

DESCRIPTION OF EMBODIMENTS

Embodiment 1

Figure 1:
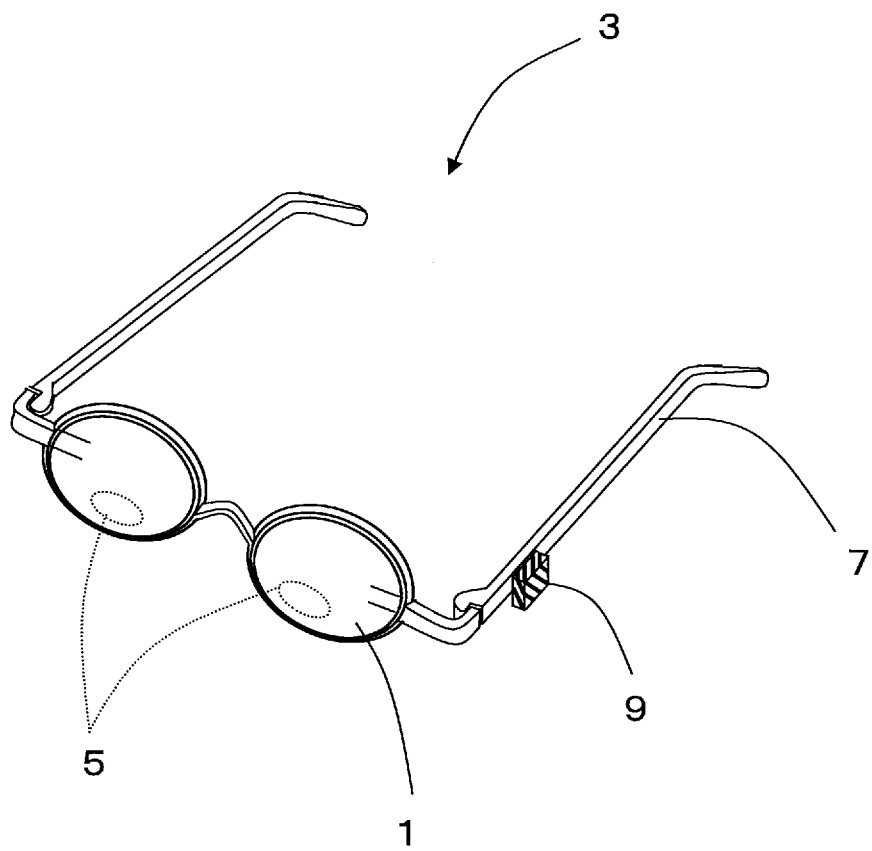
FIG. 1 is an oblique view of varifocal eyeglasses pertaining to Embodiment 1 of the present invention.

The semi-finished blank for a varifocal lens pertaining to an embodiment of the present invention will now be described in detail through reference to the drawings. FIG. 1 shows the simplified configuration of varifocal eyeglasses 3, which make use of varifocal lenses 1 obtained by subjecting the varifocal lens semi-finished blank 11 of this embodiment (see FIG. 2(a), etc.) to specific steps, such as surfacing and edging.

The varifocal lens 1 has a varifocal section 5 constituted by coating the lower region, which is slightly below the center, with a cholesteric liquid crystal material over a liquid crystal holder 25 (see FIGS. 4(a) and 4(b)). A controller 9 having a battery, a sensor circuit, etc. (not shown), is provided to an eyeglass frame 7. For example, a sensor circuit featuring an acceleration sensor has the function of outputting an on/off signal according to the up and down angle of the head of the person wearing the varifocal eyeglasses 3, and controls the voltage that is applied to the varifocal section 5.

With the varifocal eyeglasses 3 constituted as above, the application of voltage to the varifocal section 5 is switched on the basis of a signal from the sensor circuit. This allows the varifocal eyeglasses 3 to function as bifocal eyeglasses by changing the apparent refractive index of the varifocal section 5.

Figure 2:
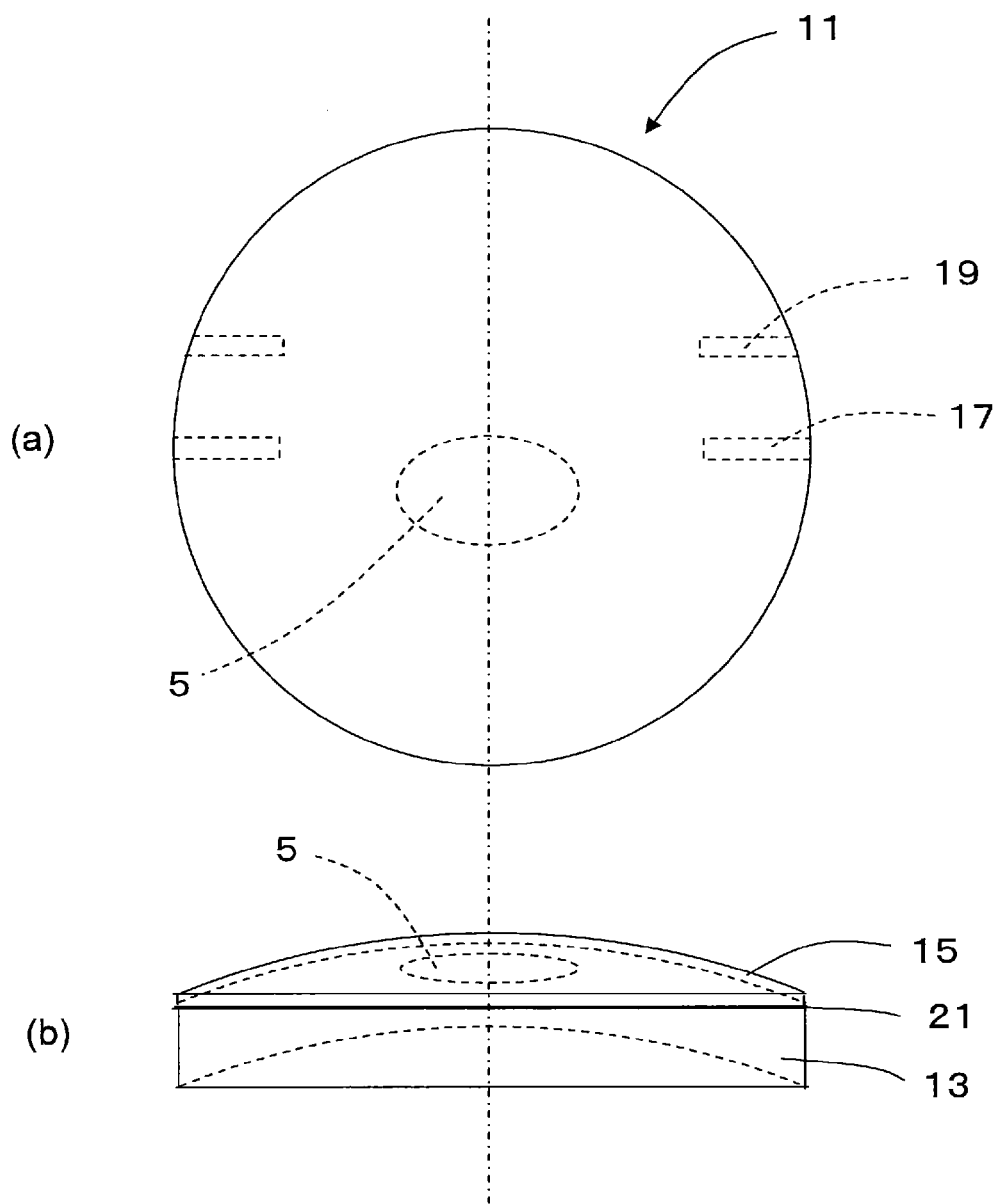
FIG. 2(a) is a front view of the semi-finished blank for a varifocal lens pertaining to Embodiment 1 of the present invention prior to the formation of a laser separation film.
FIG. 2(b) is a side view thereof.

Next, the configuration of the varifocal lens semi-finished blank 11 will be described. FIG. 2(a) is a simplified front view of the varifocal lens semi-finished blank 11 at a stage prior to the working of the lenses of the varifocal eyeglasses 3, and FIG. 2(b) is a simplified side view corresponding to this.

The varifocal lens semi-finished blank 11 has a front with a convex curved surface, and a rear with a concave curved surface. The varifocal section 5 is constituted so as to be sandwiched between a first substrate 13 and a second substrate 15. Over substantially the entire convex curved surface of the first substrate 13 and the concave curved surface of the second substrate 15 are formed thin-film layers 21 including transparent conductive films (first and second transparent conductive films 27 and 33; see FIGS. 4(b) and 5(b)) and so forth. A first internal electrode 17 and a second internal electrode 19 are disposed on the first substrate 13 and the second substrate 15, respectively, so as to be in electrical contact with the transparent conductive films of these substrates and not to be opposite each other. The first internal electrode 17 and the second internal electrode 19 are formed so as to extend inward from the outer periphery of the varifocal lens semi-finished blank 11.

Figure 3:
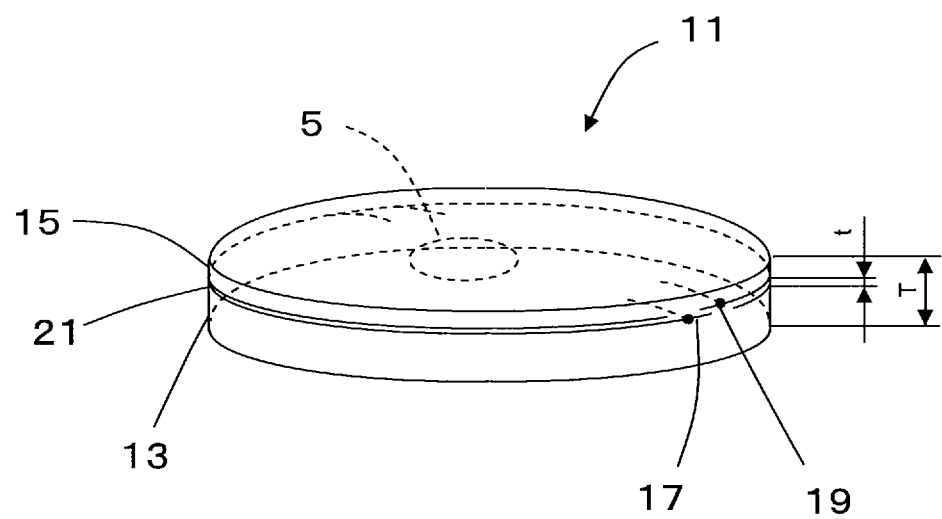
FIG. 3 is an oblique view of semi-finished blank for a varifocal lens pertaining to Embodiment 1 of the present invention.

The thin-film layer 21 includes the transparent conductive films produced on the convex curved surface of the first substrate 13 and the concave curved surface of the second substrate 15, and as shown in FIG. 3, the thickness t is approximately 10 to 30 μm. Thus, the thin-film layer 21 is far thinner than the thickness T of the varifocal lens semi-finished blank 11, which is approximately 5 to 20 mm. Accordingly, if either of the internal electrodes 17 and 19 is coated with silver paste, then the opposing transparent conductive film 27 or 33 is likely to end up being coated with silver paste as well. Specifically, if the second internal electrode 19 of the second substrate 15 is coated with silver paste to form a second external electrode 47 (see FIG. 8(a), etc.), the silver paste will tend to coat not just this second internal electrode 19, but also the first transparent conductive film 27 on the first substrate 13 that is opposite the second internal electrode 19.

With the varifocal lens semi-finished blank 11 in this embodiment, short circuiting between the transparent conductive films 27 and 33 is prevented without sacrificing the function as a lens blank even when a silver paste coating is applied. This will be described in detail below.

FIGS. 4(a) and 4(b) show simplified front and side views of the first substrate 13. The first substrate 13 is made of plastic (thiourethane) that has a convex curve on the front and a concave curve on the rear. The liquid crystal holder 25 is formed on part of the first substrate 13, in the approximate center on the convex curved surface. The first transparent conductive film 27 is formed on the convex curved surface of the first substrate 13.

The first transparent conductive film 27 has a first laser separation film (first separation film) 29 and the first internal electrode 17 in a partial region thereof.

The first laser separation film 29 is formed by using a laser to separate a partial region of the first transparent conductive film 27 formed over substantially the entire convex curved surface of the first substrate 13, at a location on the first substrate 13 that is opposite the second internal electrode 19 where the second substrate 15 is affixed on the first substrate 13. Specifically, the boundary between the first laser separation film 29 and the first transparent conductive film 27 in the outer peripheral region thereof is demarcated by a line formed by a laser. This allows the first laser separation film 29 and the first transparent conductive film 27 in the outer peripheral region thereof to be put in a state of electrical non-contact.

The first internal electrode 17 is formed at a position of electrical contact with the first transparent conductive film 27 except at the portion where the first laser separation film 29 is formed, and of electrical non-contact with the first laser separation film 29.

Figure 4:
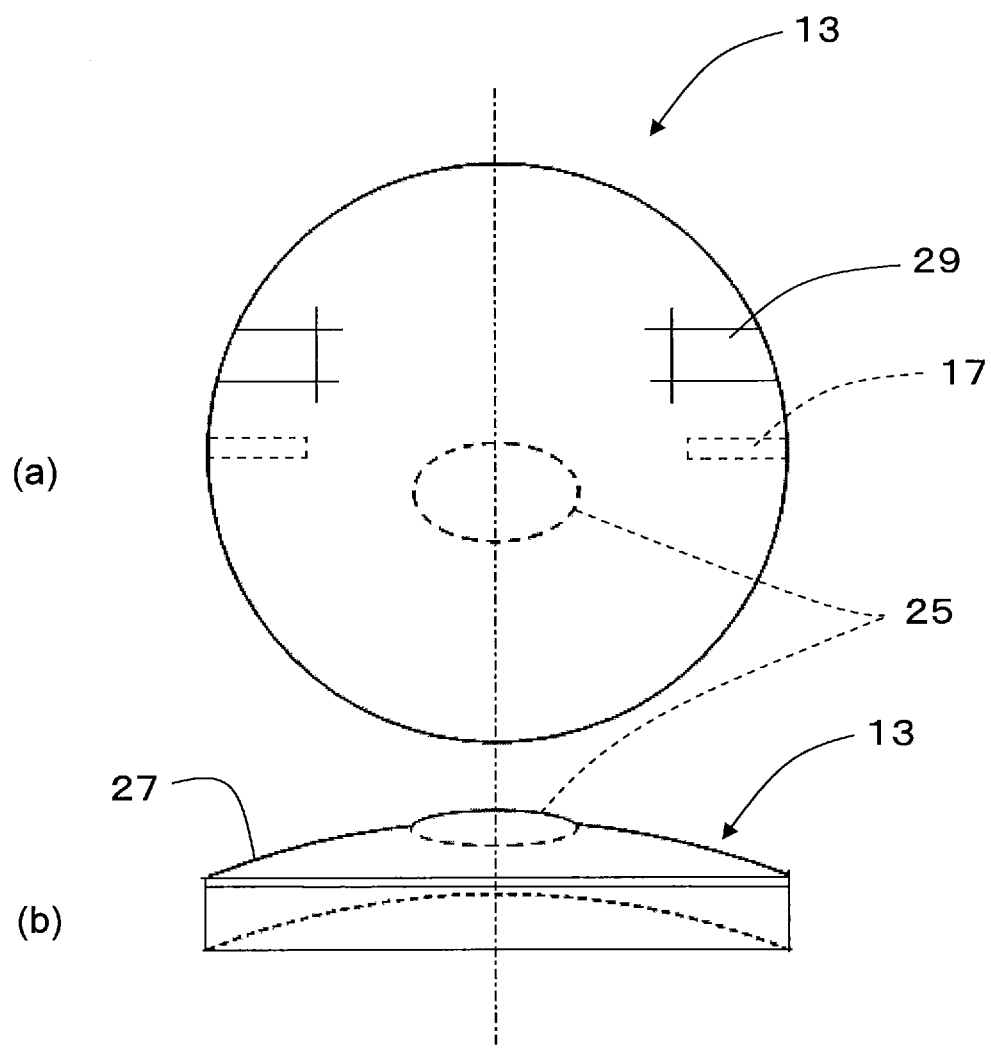
FIG. 4(a) is a front view of a first substrate constituting the semi-finished blank for a varifocal lens pertaining to Embodiment 1 of the present invention.
FIG. 4(b) is a side view thereof.
Figure 7:
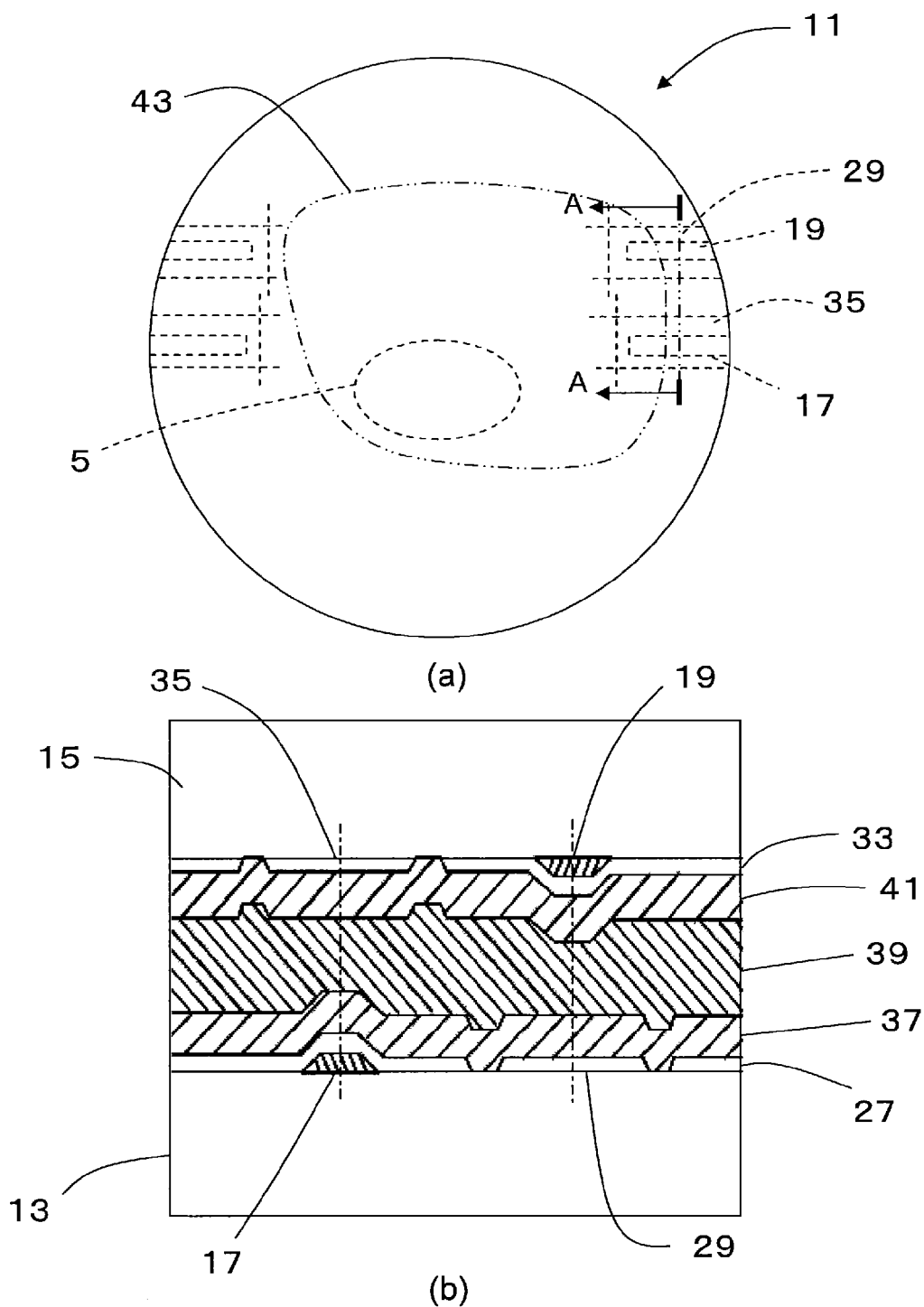
FIG. 7(a) is a front view of the semi-finished blank for a varifocal lens pertaining to Embodiment 1 of the present invention.
FIG. 7(b) is a detail cross section along the A-A thereof.

Here, the first laser separation film 29 and the first internal electrode 17 are formed independently, in left and right symmetry with respect to a straight line that passes through the center of semi-finished blanks for left and right lenses, as shown in FIGS. 4(*a*) and 4(*b*). The purpose of this is to allow the left and right lenses to be edged out of semi-finished blanks of the same type. For example, as shown in FIG. 7(*a*), when the lens for the left eye is processed, edging can be performed so as to include the first laser separation film 29 and first internal electrode 17 on the right side in the drawings.

Figure 5:
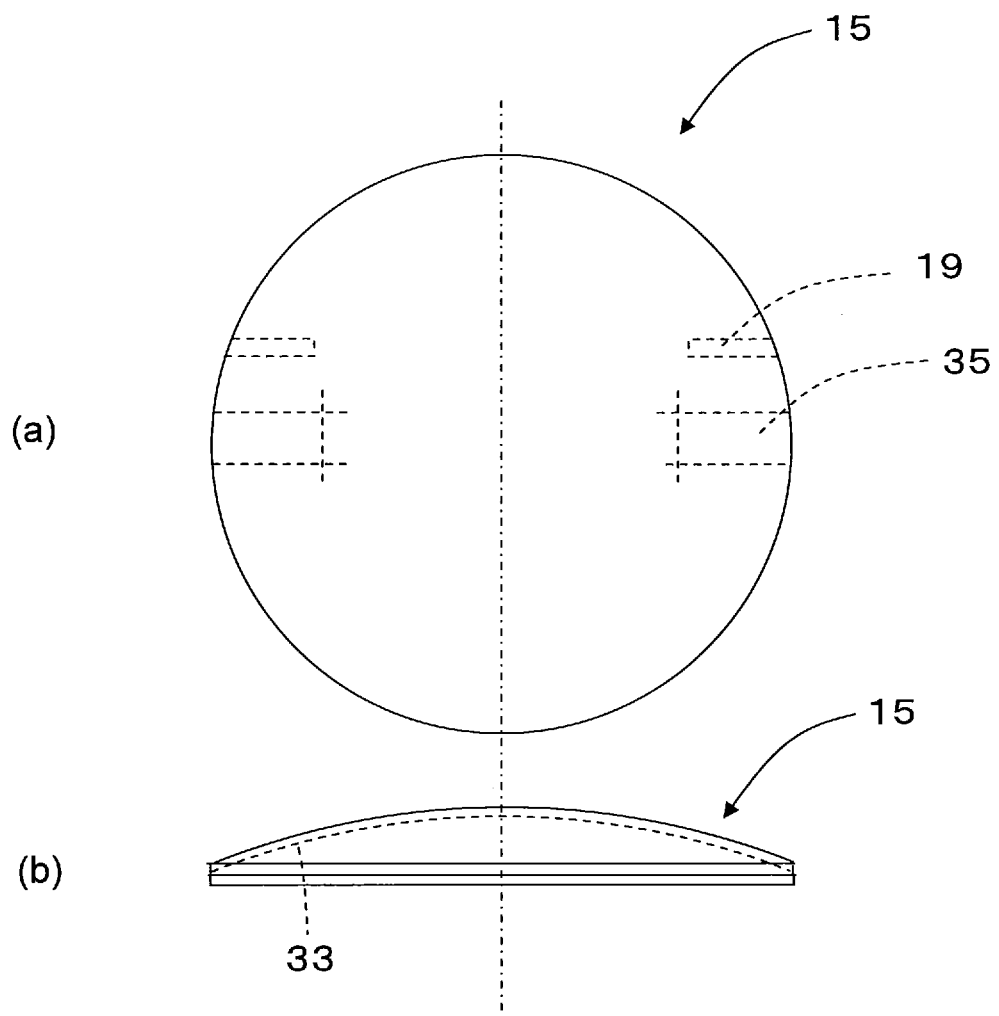
FIG. 5(a) is a front view of a second substrate constituting the semi-finished blank for a varifocal lens pertaining to Embodiment 1 of the present invention.
FIG. 5(b) is a side view thereof.

Next, the second substrate 15 that is opposite the convex curved surface of the first substrate 13 will be described in detail through reference to FIG. 5.

The second substrate 15 is made of plastic (thiourethane) that has a convex curve on the front and a concave curve on the rear. A second transparent conductive film 33 is formed on the concave curved surface of the second substrate 15.

The second transparent conductive film 33 has a second laser separation film (second separation film) 35 and the second internal electrode 19 in a partial region thereof.

The second laser separation film 35 is formed at a location that is opposite the first internal electrode 17 in a state in which the concave curved surface of the second substrate 15 has been affixed over the convex curved surface of the first substrate 13. Also, the second laser separation film 35 is separated from the second transparent conductive film 33 with a laser, and is in a state of electrical non-contact with the second transparent conductive film 33 around its outer periphery.

The second internal electrode 19 is formed at a position of electrical contact with the second transparent conductive film 33 around the outer periphery of the second laser separation film 35, and of electrical non-contact with the second laser separation film 35.

Figure 6:
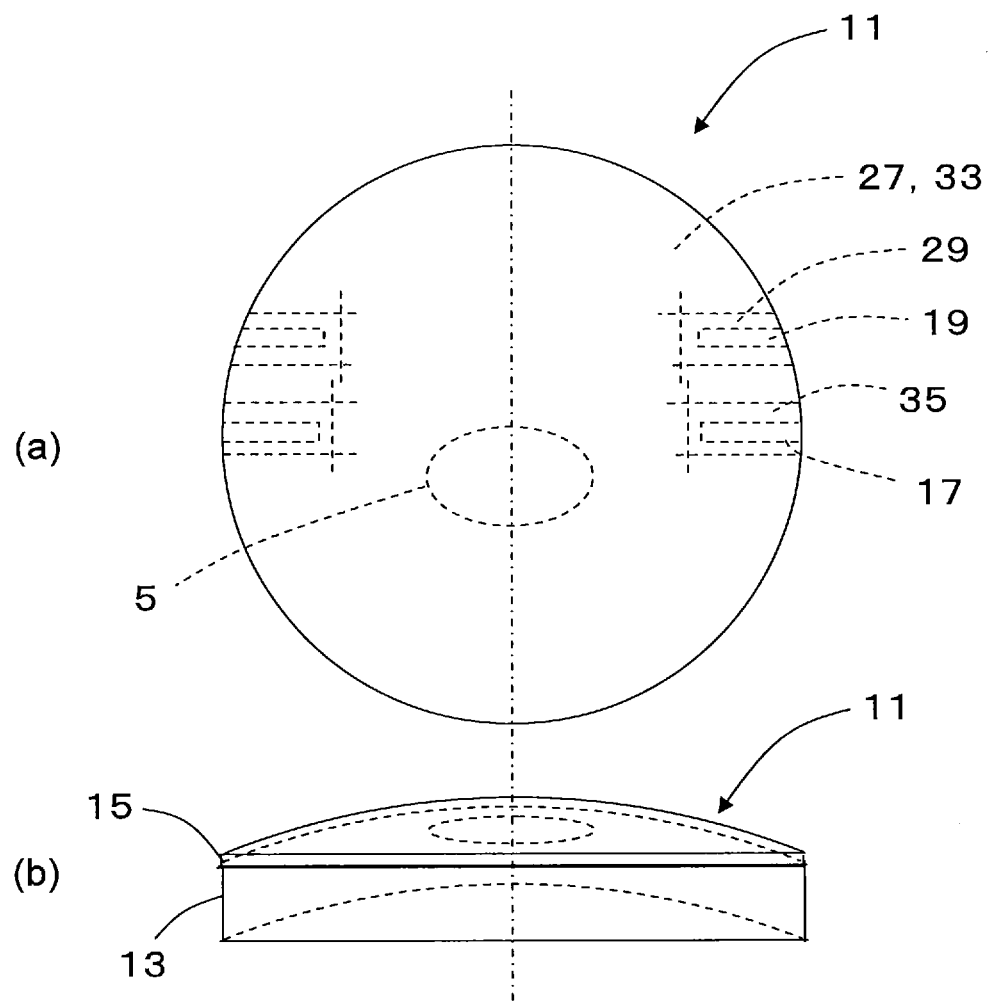
FIG. 6(a) is a front view of a semi-finished blank for a varifocal lens that combines the first substrate of FIG. 4 and the second substrate of FIG. 5.
FIG. 6(b) is a side view thereof.

FIGS. 6(*a*) and 6(*b*) show the varifocal lens semi-finished blank 11 constituted such that the first substrate 13 and the second substrate 15 have been stuck together after the liquid crystal holder 25 of the first substrate 13 (see FIGS. 4(*a*) and 4(*b*)) is coated with a cholesteric liquid crystal material and the convex curved surface of the first substrate 13 is coated with an adhesive agent.

As shown in FIGS. 6(*a*) and 6(*b*), the varifocal section 5 is disposed so as to be sandwiched between the first transparent conductive film 27 around the outer periphery of the first laser separation film 29 and the second transparent conductive film 33 around the outer periphery of the second laser separation film 35. In other words, when the semi-finished blank 11 is seen from the front, the regions of projection of the varifocal section 5 onto the first transparent conductive film 27 and the second transparent conductive film 33 do not overlap the first laser separation film 29 and the second laser separation film 35, respectively.

Next, the configuration of the varifocal lens semi-finished blank 11 will be described in detail through reference to FIGS. 7(*a*) and 7(*b*).

FIG. 7(*a*) is a simplified view of the front of the varifocal lens semi-finished blank 11. FIG. 7(*b*) is a detail cross section along the A-A line in FIG. 7(*a*). As shown in FIG. 7(*b*), the first transparent conductive film 27, a first insulation film 37, an adhesive layer 39, a second insulation layer 41, and the second transparent conductive film 33 are formed, in that order starting from the first substrate 13 side, between the first substrate 13 and the second substrate 15. The first internal electrode 17 is formed between the first substrate 13 and the first transparent conductive film 27, and the second internal electrode 19 is formed between the second substrate 15 and the second transparent conductive film 33.

The first laser separation film 29 is formed separated from the first transparent conductive film 27 by a laser so as to include a partial region of the first transparent conductive film 27 that is opposite the entire second internal electrode 19 with the adhesive layer 39 in between. Similarly, the second laser separation film 35 is formed separated from the second transparent conductive film 33 by a laser so as to include a partial region of the second transparent conductive film 33 that is opposite the entire first internal electrode 17 with the adhesive layer 39 in between.

Specifically, the configuration is such that the entire second internal electrode 19 is included in the region of projection onto the second substrate 15 where the first laser separation film 29 is formed. The entire first internal electrode 17 is included in the region of projection onto the first substrate 13 where the second laser separation film 35 is formed.

In this embodiment, the first laser separation film 29 (second laser separation film 35) is disposed so as to be opposite the entire second internal electrode 19 (first internal electrode 17) with the adhesive layer 39 in between. However, the configuration may be such that the first laser separation film 29 (second laser separation film 35) is opposite just a part of the second internal electrode 19 (first internal electrode 17) with the adhesive layer 39 in between.

Also, the laser working path that forms the first laser separation film 29 and the second laser separation film 35 is substantially U-shaped. Consequently, the first and second laser separation films 29 and 35 can be easily separated from the first and second transparent conductive films 27 and 33. A substantially U-shaped laser working path may instead be applied during the formation of just the first laser separation film 29 or the second laser separation film 35.

Thus, the first laser separation film 29 and the second laser separation film 35 are configured to be electrically independent from the first transparent conductive film 27 and the second transparent conductive film 33, respectively, by means of part the outer periphery of the varifocal lens semi-finished blank 11 and the substantially U-shaped working path.

Next, an eyeglass varifocal lens 43 obtained via specific processing from the above-mentioned varifocal lens semi-finished blank 11 will be discussed.

Figure 8:
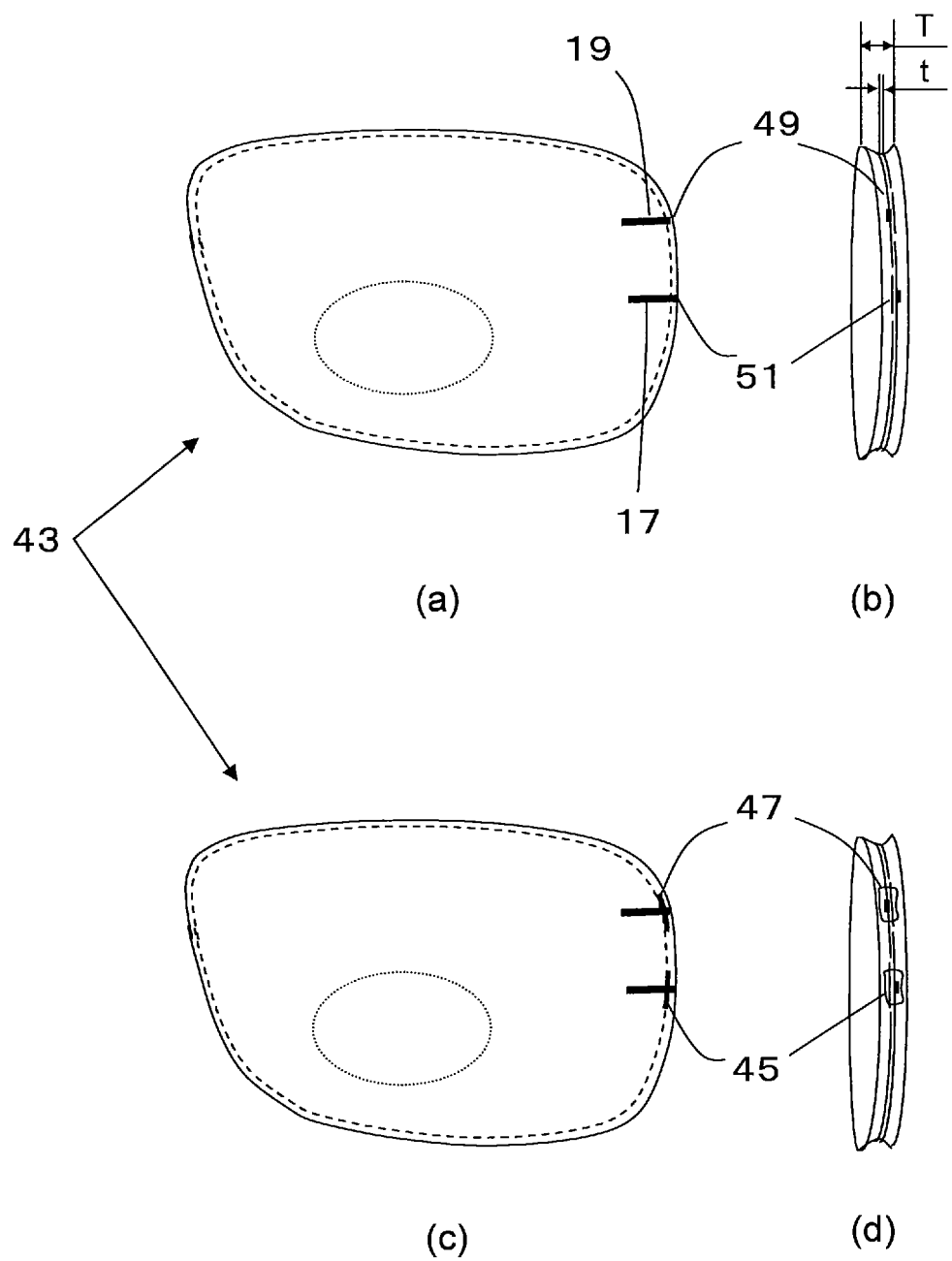
FIG. 8(a) is a front view of the semi-finished blank for a varifocal lens pertaining to Embodiment 1 of the present invention.
FIG. 8(b) is an oblique view thereof.
FIG. 8(c) is a front view of a varifocal lens in which the lens of FIG. 8(a) has been coated with an external electrode.
FIG. 8(d) is an oblique view thereof.

FIGS. 8(*a*) and 8(*b*) show the state when processing has been performed for fitting a lens that has undergone edging into the eyeglass frame 7.

FIGS. 8(*a*) and 8(*b*) show a varifocal lens 43 for the left eye, which has undergone processing around the outer periphery of the side face. More specifically, the varifocal lens 43 is obtained by removing the approximate center part in the thickness direction of the varifocal lens semi-finished blank 11, over the entire edging surface.

As shown in FIG. 7(*a*), the varifocal lens 43 is edged so that the second internal electrode 19, the first laser separation film 29, and the second laser separation film 35 are divided in two in their respective lengthwise directions. As shown in FIGS. 8(*a*) and 8(*b*), electrode terminals of the first internal electrode 17 and the second internal electrode 19 (a first terminal 51 and a second terminal 49, respectively) are processed so as to be located on the outer periphery of the side face of the varifocal lens 43, through a process of removing the side face center part of the above-mentioned varifocal lens semi-finished blank 11.

FIGS. 8(*c*) and 8(*d*) show the state when silver paste has been applied to the terminals of the first internal electrode 17 and the second internal electrode 19 present within the range of the thickness t (see FIG. 8(b)). Consequently, a first external electrode 45 and a second external electrode 47 are formed for the first and second external electrodes 17 and 19, respectively.

Similarly, the lens for the right eye is subjected to the above-mentioned processing and fitted into the eyeglass frame 7, and the external electrodes of the lenses are connected to a circuit section having a battery, a sensor circuit, etc. The varifocal eyeglasses 3 can be obtained in this way.

Figure 9:
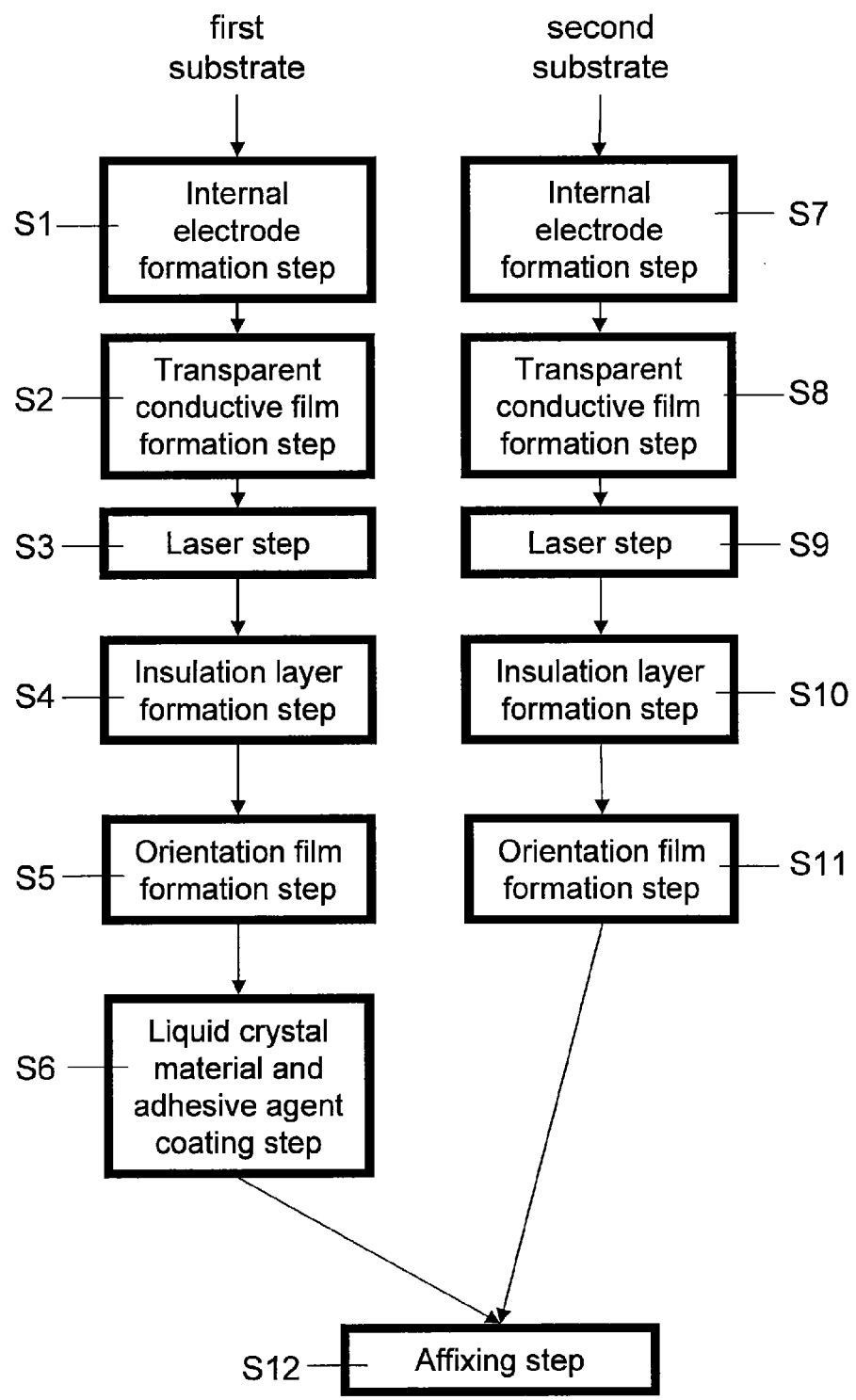
FIG. 9 is a flowchart of the manufacture of the semi-finished blank for a varifocal lens pertaining to Embodiment 1 of the present invention.
Figure 10:
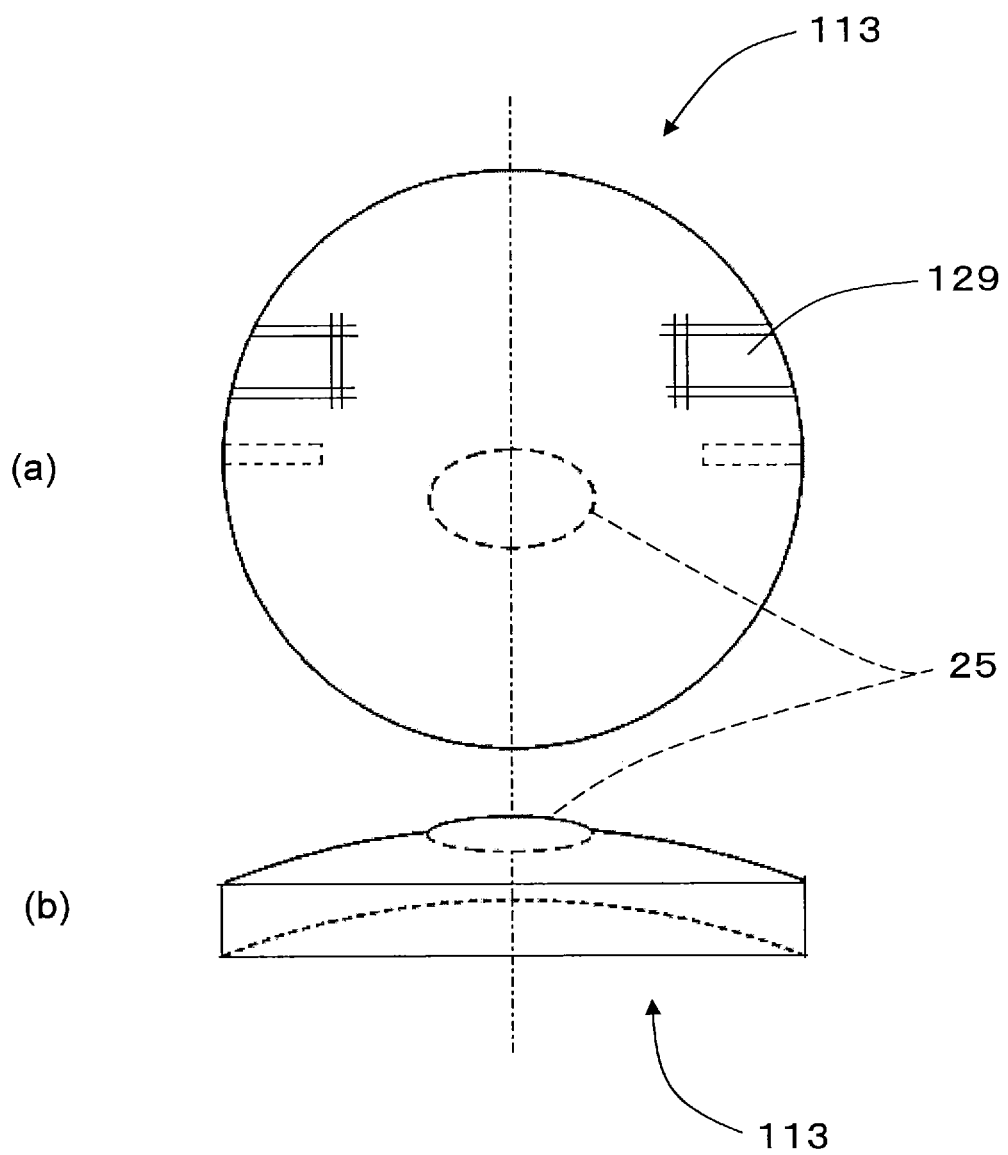
FIG. 10(a) is a front view of a first substrate constituting the semi-finished blank for a varifocal lens pertaining to Embodiment 2 of the present invention.
FIG. 10(b) is a side view thereof.
Figure 11:
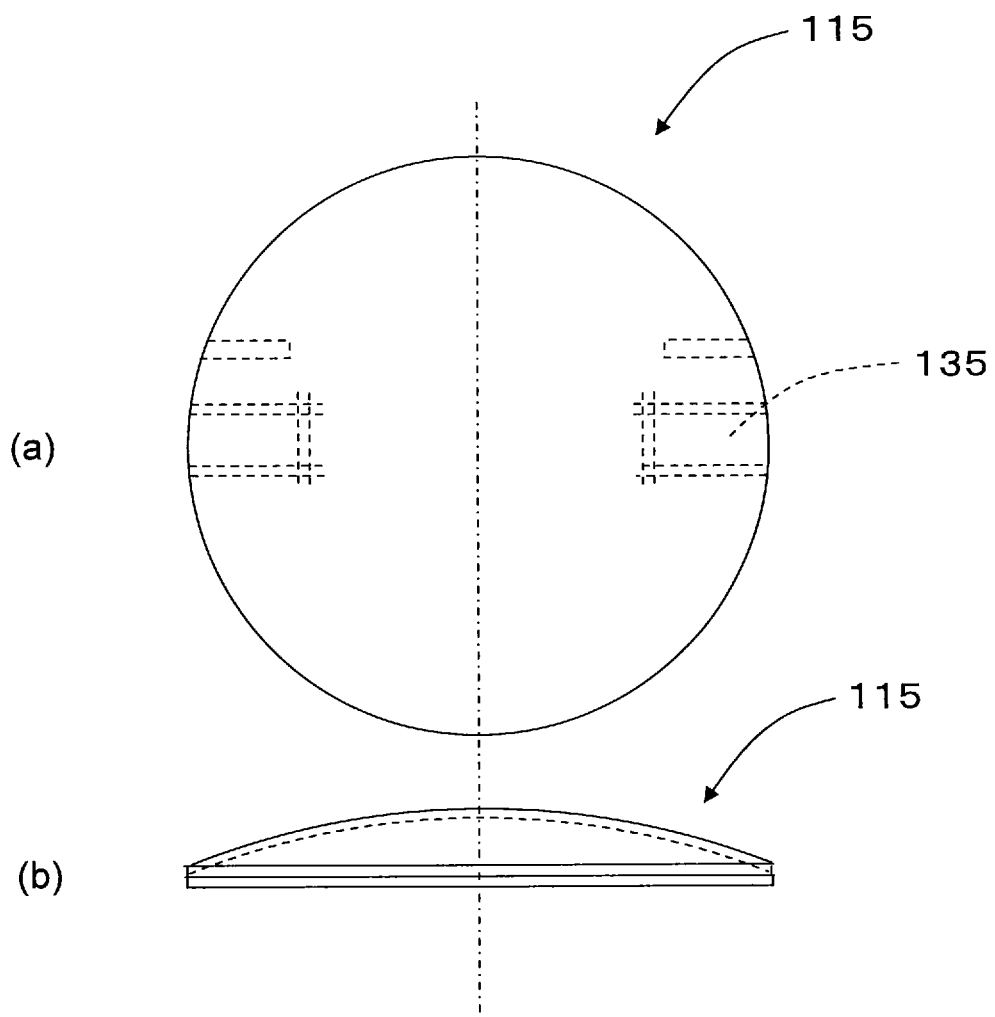
FIG. 11(a) is a front view of a second substrate constituting the semi-finished blank for a varifocal lens pertaining to Embodiment 2 of the present invention.
FIG. 11(b) is a side view thereof.
Figure 12:
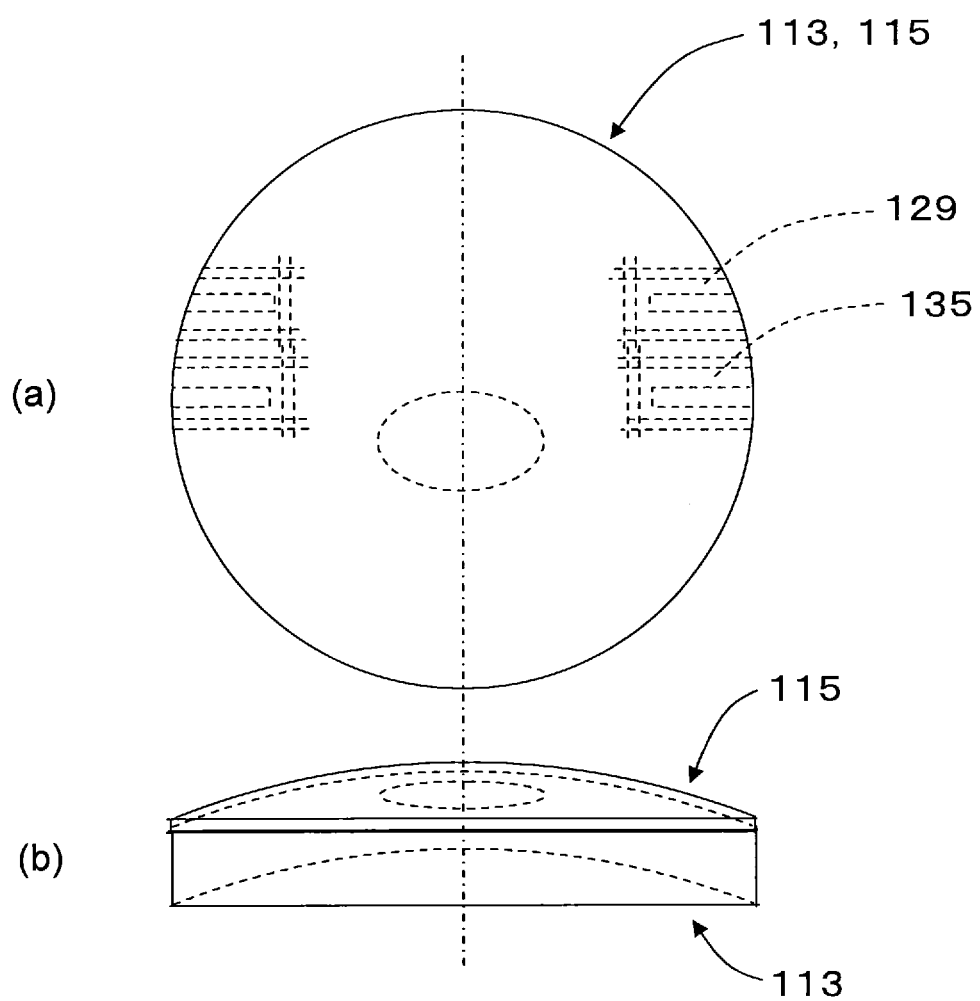
FIG. 12(a) is a front view of a semi-finished blank for a varifocal lens that combines the first substrate of FIG. 10 and the second substrate of FIG. 11.
FIG. 12(b) is a side view thereof.

Next, a method for manufacturing the varifocal lens semi-finished blank 11 will be described through reference to FIG. 9.

Steps 1 to 6 involve the manufacture of the first substrate 13, and steps 7 to 11 involve the manufacture of the second substrate 15. Step 12 involves sticking the first substrate 13 and the second substrate 15 together.

In step 1, the first internal electrode 17 is formed. More specifically, the first substrate 13 is covered with a masking sheet that replicates the first internal electrode 17, and the first internal electrode 17 is formed by spin coating, after which the masking sheet is removed. The first internal electrode 17 here is preferably formed so that it extends from the end (outer periphery) of the first substrate 13 to a position on the inside by a specific distance. This allows more of the lens to be used in the processing of the lens, without it being wasted.

In step 2, the first transparent conductive film 27 is formed by sputtering over the convex curved surface of the first substrate 13. In this embodiment, the thickness of the first transparent conductive film 27 is preferably 10 to 30 nm. In this embodiment, the first internal electrode 17 was formed before the first transparent conductive film 27, but the order of the formation may be reversed.

In step 3, laser patterning is performed to form the first laser separation film 29. Here, the first laser separation film 29 is formed at a position on the first substrate 13 that is opposite the second internal electrode 19 formed on the second substrate 15, in a state in which the first and second substrates 13 and 15 have been put together. The laser used here is preferably one that can remove just the first transparent conductive film 27. Specifically, it is undesirable to use a laser that will also remove part of the first substrate 13, or a laser with which there is inadequate electrical contact between the first transparent conductive film 27 and the first laser separation film 29 in a partial region of the former. In this embodiment, the first laser separation film 29 was formed using a YVO4 laser with a wavelength of 1064 nm, at 18 w and 60 kHz.

In step 4, the first insulation film 37 is formed by sputtering, as the step of forming the first insulation film 37 on the first substrate 13. Here, the first insulation film 37 is made of a silicon dioxide film.

In step 5, orientation is performed by forming a first orientation film (not shown) over the uppermost surface of the liquid crystal holder 25 of the first substrate 13.

In step 6, the first orientation film is coated with a liquid crystal material, and the first insulation film 37 is coated with an adhesive agent everywhere except for the region coated with the liquid crystal material.

The second substrate 15 is obtained by the same steps as those used to manufacture the first substrate 13 (steps 1 to 5), except for the step of coating with liquid crystal and an adhesive agent, so the description of steps 7 to 11 will be omitted.

The liquid crystal holder 25 is not present on the second substrate 15, but orientation is performed by forming a second orientation film (not shown) in the region of the concave curved surface of the second substrate 15 opposite the liquid crystal holder 25 in a state in which the first and second substrates 13 and 15 have been put together (step 11).

In the above steps, after the first substrate 13 and the second substrate 15 have undergone their various processing, they are placed in a sealed vessel and joined under reduced pressure conditions (step 12).

Here, the plurality of thin-film layers 21 formed between the first substrate 13 and the second substrate 15 have a thickness t of approximately 10 to 30 μm, as shown in FIG. 3, which is far less than the thickness T of the varifocal lens semi-finished blank 11 (approximately 5 to 20 mm) Accordingly, when the first and second internal electrodes 17 and 19 are coated with silver paste, there is the risk that the silver paste will end up coating the second and first transparent conductive films 33 and 27 via the adhesive layer 39 in between the first and second substrates 13 and 15.

Specifically, when the external electrodes are formed by coating the second internal electrode 19 of the second substrate 15 with silver paste, there is the risk that the silver paste will coat not just the second internal electrode 19, but also the first transparent conductive film 27 on the first substrate 13 opposite the second internal electrode 19 via the adhesive layer 39.

In this embodiment, the means for preventing short circuiting between the first transparent conductive film 27 and the second transparent conductive film 33 that apply voltage to the varifocal section 5 is to use a laser to separate a partial region of the first transparent conductive film 27 (second transparent conductive film 33) as the first laser separation film 29 (second laser separation film 35), and provide the first laser separation film 29 (second laser separation film 35) at a position that is opposite the second internal electrode 19 (first internal electrode 17).

Consequently, the first laser separation film 29 (second laser separation film 35) and the rest of the region of the first transparent conductive film 27 (second transparent conductive film 33) can be in a state of electrical non-contact, and short circuiting between the first and second transparent conductive films 27 and 33 that sandwich the varifocal section 5 can be prevented while sacrificing hardly any of the function as a lens. Specifically, since the boundary between the first and second laser separation films 29 and 35 and the first and second transparent conductive films 27 and 33 is formed with a laser, a good varifocal lens 43 can be provided with which there is almost no variation in refractive index or transmissivity from one region to the next, throughout the entire region other than the varifocal section 5. Also, since the boundary between the first and second laser separation films 29 and 35 and the first and second transparent conductive films 27 and 33 is formed by removing the first and second transparent conductive films 27 and 33 with a laser, no masking surface or the like will be left in a visible state on the varifocal lens 43.

Also, with the above constitution, separation between the films included in the thin-film layer 21 can be prevented in the course of using the eyeglasses, manufacturing the lenses, etc. Specifically, the joint strength between the first and second transparent conductive films 27 and 33 and the first and second substrates 13 and 15 is higher than the joint strength between the first and second insulation layers (silicon dioxide layers) 37 and 41 and the first and second substrates 13 and 15. Therefore, separation is apt to occur between the films when a region with no transparent conductive film is formed by masking as with prior art. In this embodiment, since the first and second transparent conductive films 27 and 33 are removed by laser, separation between the films can be kept to a minimum.

Furthermore, fewer steps are entailed by the manufacturing process than when regions where the first and second transparent conductive films 27 and 33 are not formed by masking are provided over the first and second substrates 13 and 15.

Embodiment 2

FIGS. 10(a) to 12(b) are diagrams illustrating a second embodiment of the present invention. Here, those members that are the same as in Embodiment 1 above will be numbered the same and not described again.

In Embodiment 1 above, the boundary between the first laser separation film 29 and the rest of the first transparent conductive film 27 is substantially U-shaped, and these are separated by a single line by laser. In contrast, the difference in this embodiment, as shown in FIG. 10(a), is that a first laser separation film (first separation film) 129 is formed by double (an example of multiple) boundary lines by laser on a first substrate 113. Similarly, FIG. 11(a) shows that a second laser separation film (second separation film) 135 is formed by double boundary lines by laser. FIGS. 12(a) and 12(b) show the state when the first substrate 113 and a second substrate 115 have been stuck together.

Again in this embodiment, with this constitution short circuiting between the first and second transparent conductive films 27 and 33 can be more effectively prevented even when the partial removal of the first and second transparent conductive films 27 and 33 by laser is incomplete, or when the amount of silver paste coating is greater than intended.

The above-mentioned boundary lines do not have to be double, and may be laser lines that are more than doubled, in order to achieve better reliability. Again, when the boundary lines are configured as above, only a small amount of the first and second transparent conductive films 27 and 33 is removed, so no masking surface will be visible in the use of the eyeglass lenses, and there is no practical problem.

Also, in this embodiment the boundary lines between the first laser separation film 129 and the rest of the first transparent conductive film 27, and the boundary lines between the second laser separation film 135 and the second transparent conductive film 33, were double laser lines, but when simplification of the process is taken into account, just the boundary lines of one or the other may be double (multiple).

In both Embodiments 1 and 2 above, an example was given in which a laser was used to separate a partial region of the first and second transparent conductive films 27 and 33, but the present invention is not limited to this.

For instance, some other means, such as photoetching or masking, may be used to separate the region of the first transparent conductive film into a first region and a second region, and similarly to separate the region of the second transparent conductive film into a third region and a fourth region.

INDUSTRIAL APPLICABILITY

The semi-finished blank for a varifocal lens pertaining to the present invention has the effect of effectively preventing short circuiting between upper and lower transparent conductive films, and therefore can be widely applied in the field of lenses used in optical parts, such as eyeglass lenses and cameras.

REFERENCE SIGNS LIST 1 varifocal lens
3 varifocal eyeglasses
5 varifocal section
7 eyeglass frame
9 controller
11 varifocal lens semi-finished blank
13 first substrate
15 second substrate
17 first internal electrode
19 second internal electrode
21 thin-film layer
25 liquid crystal holder
27 first transparent conductive film
29 first laser separation film (first separation film)
33 second transparent conductive film
35 second laser separation film (second separation film)
37 first insulation film
39 adhesive layer
41 second insulation layer
43 varifocal lens
45 first external electrode
47 second external electrode
49 second terminal
51 first terminal
113 first substrate
115 second terminal
129 first laser separation film (first separation film)
135 second laser separation film (second separation film)

The invention claimed is:

1. A semi-finished blank for a varifocal lens, comprising:
a first substrate;
a second substrate that is opposite the first substrate;
a first transparent conductive film produced on the front of the first substrate;
a second transparent conductive film produced on the back of the second substrate;
a varifocal section disposed between the first transparent conductive film and the second transparent conductive film;
a first internal electrode that is connected to the first transparent conductive film;
a second internal electrode that is connected to the second transparent conductive film;
a first separation film, which is a separated partial region of the first transparent conductive film, is in a state of electrical non-contact with the first transparent conductive film, and is located opposite the second internal electrode connected to the second transparent conductive film; and
a second separation film, which is a separated partial region of the second transparent conductive film, is in a state of electrical non-contact with the second transparent conductive film, and is located opposite the first internal electrode connected to the first transparent conductive film.

2. The semi-finished blank for a varifocal lens according to claim 1,
wherein the first separation film is separated from the first transparent conductive film around an outer periphery of the first separation film by a substantially U-shaped cutout.

3. The semi-finished blank for a varifocal lens according to claim 1,
wherein the first separation film is separated from the first transparent conductive film with a multiple laser beam.

4. A varifocal lens, comprising:
a first substrate;
a second substrate that is opposite the first substrate;

a first transparent conductive film produced on the front of the first substrate;

a second transparent conductive film produced on the back of the second substrate;

a varifocal section disposed between the first transparent conductive film and the second transparent conductive film;

a first internal electrode that is connected to the first transparent conductive film;

a second internal electrode that is connected to the second transparent conductive film;

a first terminal and a second terminal that are connected to the first internal electrode and the second internal electrode respectively, and are provided on a side face of the lens;

a first separation film, which is a separated partial region of the first transparent conductive film, is in a state of electrical non-contact with the first transparent conductive film, and is located opposite the second internal electrode connected to the second transparent conductive film; and a second separation film, which is a separated partial region of the second transparent conductive film, is in a state of electrical non-contact with the second transparent conductive film, and is located at a location opposite the first internal electrode connected to the first transparent conductive film.

5. A varifocal lens, comprising:

a first substrate;

a second substrate that is opposite the first substrate;

a first transparent conductive film produced on the front of the first substrate;

a second transparent conductive film produced on the back of the second substrate;

a varifocal section disposed between the first transparent conductive film and the second transparent conductive film;

a first internal electrode that is connected to the first transparent conductive film;

a second internal electrode that is connected to the second transparent conductive film;

a first terminal and a second terminal that are connected to the first internal electrode and the second internal electrode respectively, and are provided on a side face of the lens;

a first separation film, which is a separated partial region of the first transparent conductive film, is in a state of electrical non-contact with the first transparent conductive film, and is located opposite the second internal electrode connected to the second transparent conductive film;

a second separation film, which is a separated partial region of the second transparent conductive film, is in a state of electrical non-contact with the second transparent conductive film, and is located at a location opposite the first internal electrode connected to the first transparent conductive film;

a first external electrode that connects the first terminal and the second separation film; and a second external electrode that connects the second terminal and the first separation film.

6. The varifocal lens according to claim 5, wherein the first external electrode and the second external electrode are made up of silver paste.

7. Varifocal eyeglasses that include:

a varifocal lens, comprising:

a first substrate;

a second substrate that is opposite the first substrate;

a first transparent conductive film produced on the front of the first substrate;

a second transparent conductive film produced on the back of the second substrate;

a varifocal section disposed between the first transparent conductive film and the second transparent conductive film;

a first internal electrode connected to the first transparent conductive film;

a second internal electrode connected to the second transparent conductive film;

a first separation film, which is a separated partial region of the first transparent conductive film, is in a state of electrical non-contact with the first transparent conductive film, and is located opposite the second internal electrode connected to the second transparent conductive film; and a second separation film, which is a separated partial region of the second transparent conductive film, is in a state of electrical non-contact with the second transparent conductive film, and is located opposite the first internal electrode connected to the first transparent conductive film, and a controller that applies voltage to the varifocal section through the first internal electrode and the second internal electrode, and controls this applied voltage.

8. The semi-finished blank for a varifocal lens according to claim 1, wherein the second separation film is separated from the second transparent conductive film around an outer periphery of the second separation film by a substantially U-shaped cut-out.

9. The semi-finished blank for a varifocal lens according to claim 1, wherein the second separation film is separated from the second transparent conductive film with a multiple laser beam.

* * * * *